United States Patent
Schuetz et al.

(10) Patent No.: US 9,784,399 B2
(45) Date of Patent: Oct. 10, 2017

(54) DAMPER FOR AIR LINES OF AN INTERNAL COMBUSTION ENGINE HAVING A TURBOCHARGER AND METHOD FOR PRODUCING SAID DAMPER

(75) Inventors: Reinhard Schuetz, Kleinblittersdorf (DE); Paul Lippke, Kunzell (DE)

(73) Assignees: UMFOTEC GMBH, Northeim (DE); Dietrich Denker, Ostfildern (DE)

( * ) Notice: Subject to any disclaimer, the term of this patent is extended or adjusted under 35 U.S.C. 154(b) by 383 days.

(21) Appl. No.: 14/353,565

(22) PCT Filed: Jul. 18, 2012

(86) PCT No.: PCT/EP2012/062055
§ 371 (c)(1),
(2), (4) Date: Jul. 29, 2014

(87) PCT Pub. No.: WO2013/060489
PCT Pub. Date: May 2, 2013

(65) Prior Publication Data
US 2014/0345733 A1  Nov. 27, 2014

(30) Foreign Application Priority Data
Oct. 28, 2011 (DE) .................. 10 2011 085 452

(51) Int. Cl.
*F16L 55/027* (2006.01)
*F16L 55/033* (2006.01)
(Continued)

(52) U.S. Cl.
CPC ............ *F16L 55/033* (2013.01); *B29C 49/20* (2013.01); *B29C 49/30* (2013.01);
(Continued)

(58) Field of Classification Search
CPC .................................................. F16L 55/033
(Continued)

(56) References Cited

U.S. PATENT DOCUMENTS

| 5,762,858 A | 6/1998 | Maeda et al. |
| 6,009,705 A | 1/2000 | Arnott et al. |
| 2013/0263823 A1 | 10/2013 | Denker et al. |

FOREIGN PATENT DOCUMENTS

| DE | 19855708 A1 | 6/2000 |
| DE | 102008032491 A1 | 1/2010 |

(Continued)

OTHER PUBLICATIONS

International Search Report issued Dec. 12, 2012 re: PCT/EP2012/062055; citing: U.S. Pat. No. 5,762,858 A, DE 198 55 A1, JP 61-083020 A and JP 53-030660 A.

*Primary Examiner* — Vishal Pancholi
(74) *Attorney, Agent, or Firm* — Cantor Colburn LLP (57) ABSTRACT

A method for producing a damper for an air line of an internal combustion engine includes the following steps: providing a temperature-controlled inner part having passages; producing a tubular preform of an outer jacket from a thermoplastic melt; and attaching the temperature-controlled inner part to a blowing mandrel of a blow mold, which is open. The blowing mandrel has outlet openings and the passages are positioned over the outlet openings. The method further includes bringing the temperature-controlled preform over the inner part and closing the blow mold such that the preform is blown against the walls of the blow mold, whereby an outer jacket is obtained. Simultaneously, local connections between the inner part and the outer jacket are obtained by pressing the preform and the inner part against each other in some regions. Finally, the blow mold is opened and the damper is removed.

8 Claims, 6 Drawing Sheets

(51) Int. Cl.
    *F02M 35/12*     (2006.01)
    *B29C 49/20*     (2006.01)
    *B29C 49/42*     (2006.01)
    *B29C 49/30*     (2006.01)
    B29L 23/00     (2006.01)
    B29C 49/04     (2006.01)
    B29L 31/30     (2006.01)

(52) U.S. Cl.
    CPC ..... *B29C 49/4242* (2013.01); *F02M 35/1211* (2013.01); *F02M 35/1266* (2013.01); *F02M 35/1283* (2013.01); *B29C 49/04* (2013.01); *B29C 2049/2008* (2013.01); *B29C 2049/2047* (2013.01); *B29C 2049/2078* (2013.01); *B29C 2049/2095* (2013.01); *B29L 2023/00* (2013.01); *B29L 2023/22* (2013.01); *B29L 2031/30* (2013.01)

(58) Field of Classification Search
    USPC .............................................. 138/37, 40, 42
    See application file for complete search history.

(56) References Cited

FOREIGN PATENT DOCUMENTS

| | | |
|---|---|---|
| EP | 0701083 A1 | 3/1996 |
| EP | 0761413 A2 | 3/1997 |
| JP | 53-30660 A | 3/1978 |
| JP | 61-83020 A | 4/1986 |

DAMPER FOR AIR LINES OF AN INTERNAL COMBUSTION ENGINE HAVING A TURBOCHARGER AND METHOD FOR PRODUCING SAID DAMPER

FIELD

The disclosure relates to a damper for an air line of an internal combustion engine and to a method and device for producing such a damper. In particular, the disclosure relates to a charge-air line of an internal combustion engine having a turbocharger.

BACKGROUND

Dampers of the type in question here are also referred to as absorbers and resonators. Reference is made, by way of example, to DE 198 55 708 B4, DE 10 2008 032 491 A1 and DE 10 2010 042 893. Such dampers have proven successful in practice. They make it possible to avoid disturbing noises in the area of the charge-air line. The dampers can be produced in induction systems to match the available installation space. However, there is not always sufficient space available for the dampers; the required volumes are often not sufficient for the design of the sound dampers. It is therefore endeavored to make the dampers as small as possible and to make them match existing intermediate spaces between other components of the internal combustion engine as optimally as possible.

EP 761413 B1 discloses a method for producing a damper from plastic by extrusion blow molding. In this case, a preform is first extruded in an open mold. Then, after closing the mold, part of the mold is opened at a place at which an accessory is to be molded, and an extension of the preform is first formed at the place at which the mold is open, in a first blow-molding step. Then the previously open part of the mold is closed by another mold piece, which is adapted to the extension, and a second blow-molding operation is carried out, whereby the final form is achieved.

EP 701 083 B1 describes a connection tube with a chamber attached laterally to it. It also describes a method for producing such a component comprising a connection tube and a chamber.

DE 69 604 195 T3 discloses a method for producing a sound damper in which a first part of the housing is produced from plastic and a second part of the housing is produced from plastic and these two parts are subsequently connected to one another. A blow-molding operation does not take place.

Dampers of the type mentioned at the beginning are mainly used for internal combustion engines having turbochargers. These internal combustion engines have a relatively small swept volume, and consequently also relatively small dimensions. The relatively small dimensions lead to relatively small installation spaces for the individual parts, for example also for the dampers. The space available for the sound absorption is therefore small.

The operating noises emitted by the internal combustion engine are expected to meet prescribed requirements. It is desired that the engine sounds as good as possible. In the case of turbocharged engines, one of the reasons for noises to occur is the distribution of the charge air within a turbocharger. There are other noises in addition to this. Those noises that are within the human audible range are to be damped in particular. A desired noise emission that is favorable for the internal combustion engine and for the car is to be achieved. To do so, engine developers are increasingly demanding sound reduction in wide frequency ranges.

For prior art, reference is made generally to the German book by the authors Michael Thielen, Klaus Hartwig and Peter Gust "Blasformen von Kunststoff-Hohlkörpern" [Blow-molding of plastic hollow bodies], Hanser-Verlag 2006.

Among the processes that are used today for the production of such dampers, for example the damper according to DE 198 55 708 B4, is that known as hydroforming. In this way, outer jackets with one or more volume chambers can be produced in sheet metal. However, these outer jackets still have to be connected, for example welded or brazed, to further components in order to obtain a complete damper. Moreover, a tightness test also has to be carried out.

SUMMARY

On this basis, the disclosure relates to producing a damper completely in one operation, without subsequent joining measures being necessary. It is at the same time intended that multiple volume chambers can be created. It is also intended to be possible to produce the damper with connection tubes arranged on one or both sides and, if appropriate, also to create the damper with a tube connected at least on one side of the damper.

This damper is produced from a suitable plastic. Production is performed by blow molding. This makes it possible to mold an outer jacket and connect it to an inner part in one operation. The connection can be made with a tight seal, so that there is no longer any need for testing for tightness. Blow-molding technology makes a wide variety of design variants of the damper possible. There is no longer any need for cost-intensive welded or brazed connections. A considerable weight saving, and consequently also reduced $CO2$ emission, can be achieved. Overall, a noticeable cost reduction is possible.

The damper is suitable in particular for tubes and lines that are equipped with a damper as an integrated component directly at the stub of the compressor housing of the turbocharger or in the air path. The production method allows the production in one operation of an acoustically adapted system that has a damper, and if appropriate a connection stub, if appropriate also a tube, and can be appropriately adapted according to the installation situation in the vehicle.

The sequence of the individual method steps is not compulsory. In particular, the sequence of the first two method steps may be changed. In the case of the step of fitting the temperature-controlled preform over the temperature-controlled inner part, any contact between the preform and the inner part is avoided. An air gap remains between the two parts. This avoids the occurrence of an unwanted connection between the inner part and the preform.

The temperature of the preform is controlled in such a way that the blow-molding operation can take place. The temperatures necessary for this are dependent on the plastic used. The inner part is sufficiently heated and the preform is at such a temperature that a secure connection, in particular welding, is achieved in the step of pressing the preform and the inner part against one another. The preform and the inner part are preferably produced from the same plastic. Heavy-duty plastics, as are already used according to the prior art for dampers, are used.

In a preferred development, in the case of the step of creating the tubular preform for the outer jacket, a preform part for a connection tube is also produced at the same time as and in one piece with this preform. This preform part remains outside the blow mold. A mold of its own may be provided for the preform part, likewise designed as a blow mold and referred to hereinafter as the lower blow mold. In this case, a blow-molding operation is carried out in the lower blow mold in order to obtain the connection tube. The two blow-molding operations are preferably carried out together. The mold cavities of the two blow molds are preferably connected to one another.

The preform part may advantageously be deformed before such a blow-molding step in such way that its axial line assumes any desired form, for example has curvatures, an S shape or the like. In this way, a damper with a connection tube on one side, if appropriate also with connection tubes at both ends of the damper, can be produced in a single working step.

DETAILED DESCRIPTION OF THE FIGURES

In the production of a damper, first an inner part 20 and a preform 22 are produced. The same plastics material is used for both. The inner part 20 is substantially tubular; it has passages 24. It may be produced in any desired production process, for example injection-molding. It is brought to a temperature at which it still has mechanical strength and can be handled as a component. This temperature is chosen to be of such a level that a welding operation takes place when the inner part 20 is pressed against the likewise temperature-controlled preform 22.

Figure 1:
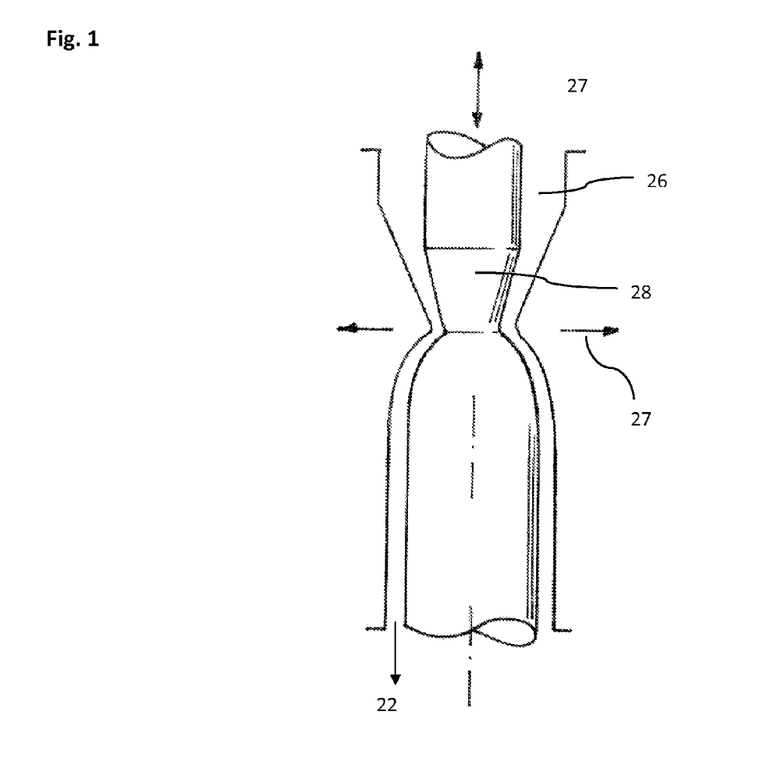
FIG. 1 shows a basic sectional diagram through an extrusion die for the creation of a preform, if appropriate together with a preform part.

The preform 22 is produced in the known way from a plastic by the extrusion process. This is performed in a device such as that schematically represented by way of example in FIG. 1. In this case, the molten plastic is pressed vertically from above into a flow channel 26. Within the flow channel 26 there is a mandrel 28, the position of which can be changed both in the horizontal direction and in the vertical direction, see arrows 27. When there is a change in the position of the mandrel 28 in the vertical direction, the annular gap around the mandrel 28 is increased or reduced, as a result of which the wall thickness of the preform 22 is changed. If the mandrel 28 is moved in the horizontal direction, preforms 22 with a wall thickness that is unevenly distributed over the circumference may be obtained. The outside diameter of the preform 22 is determined by the dimension D. The dimension d stands for the local wall thickness of the preform 22. The creation of the preform 22 is known per se; for disclosure, reference is made to the German book mentioned at the beginning, Blasformen von Kunststoff-Hohlkörpern.

Figure 2:
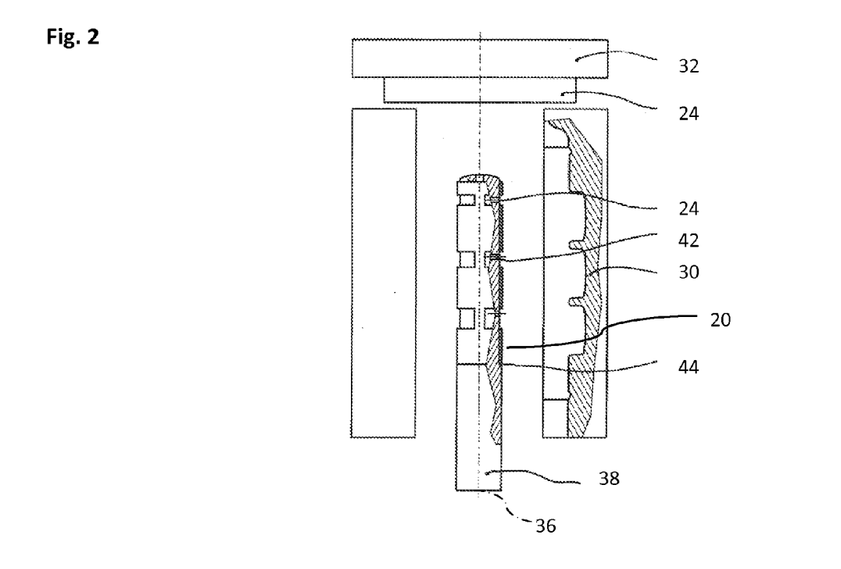
FIG. 2 shows a side view of an opened blow mold with a blowing mandrel and a fitted inner part in a basic representation; the representation is in the form of a sectional diagram to the right of an axial line.

FIG. 2 shows a blow mold 30, such as that which can be seen in a similar embodiment from the already mentioned book. The blow mold shown has two mold halves. Blow molds with more than two mold halves may also be used. Above the blow mold 30 there is an accumulator head 32, which serves for the production of the preform 22; under that is the die 34, which can be seen from FIG. 1 and is adjustable. The blow mold 30 has a central axis 36. The blowing mandrel 38 is introduced into the blow mold from below. It has air channels 40, which open out into outlet openings 42 on the cylindrical outer jacket of the blowing mandrel 38. In the state that is shown in FIG. 2, the inner part 20 has already been fitted over the blowing mandrel 38. The blowing mandrel has a stop 44; the lower end region of the inner part 20 is in contact with this stop 44. In this state, the passages 24 of the inner part 20 are located above outlet openings 42. As a result, blowing air can flow through them into the internal mold cavity. The internal mold cavity is made in such a way that it reproduces the later outer design of the damper to be created. In fact, the blow mold 30 has three chambers for the formation of three volume chambers 45 of the damper to be created. These respectively communicate with the internal space of the inner part 20 by way of passages 24.

Figure 3:
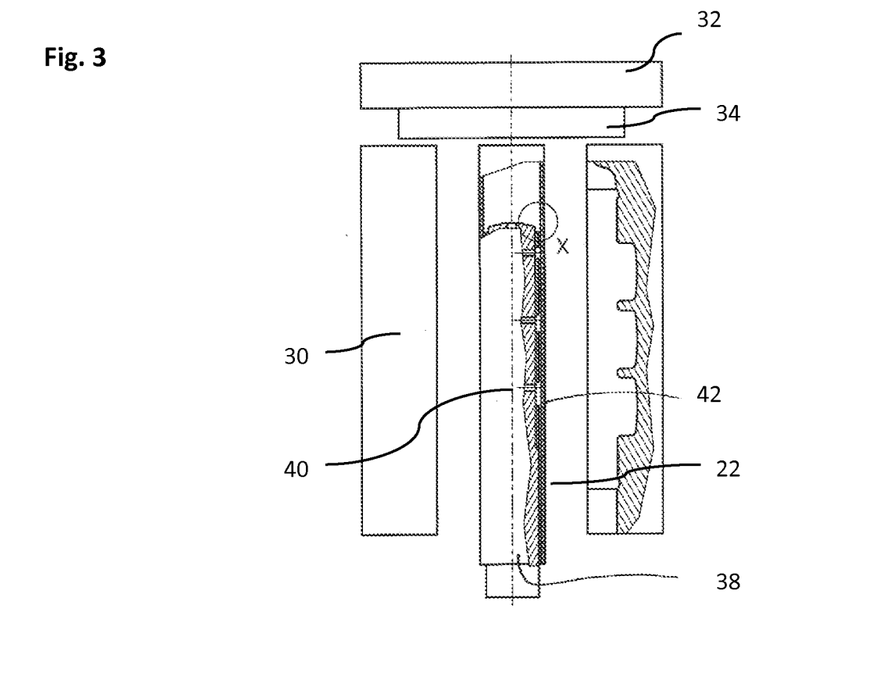
FIG. 3 shows a representation like FIG. 2, but now additionally with an introduced preform.

In the state that is shown in FIG. 3, in addition to FIG. 2, the preform 22 has been created and fitted over the temperature-controlled inner part 20. The inner part 20 is located within the preform 22. The detail X shows that a small gap 47 is maintained between the inner part 20 and the preform 22. This gap 47 is intended to achieve the effect that no contact takes place between the inner part 20 and the preform 22, and in particular there is no local welding and/or the fitting of the preform 22 in the axial direction over the inner part 20 is hindered. The temperatures of the inner part 20 and the preform 22 are set in such a way that, as far as possible, contact between the two does not yet lead to welding 49. Welding should only occur when the two parts are pressed together.

Figure 4:
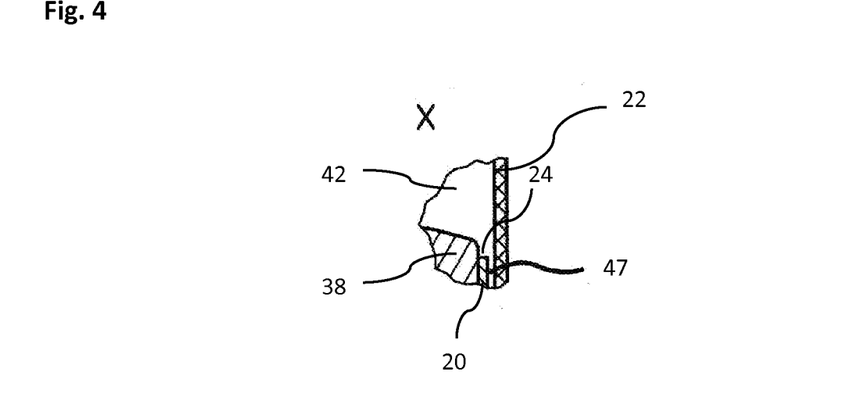
FIG. 4 shows the detail X from FIG. 3 in an enlarged representation.
Figure 5:
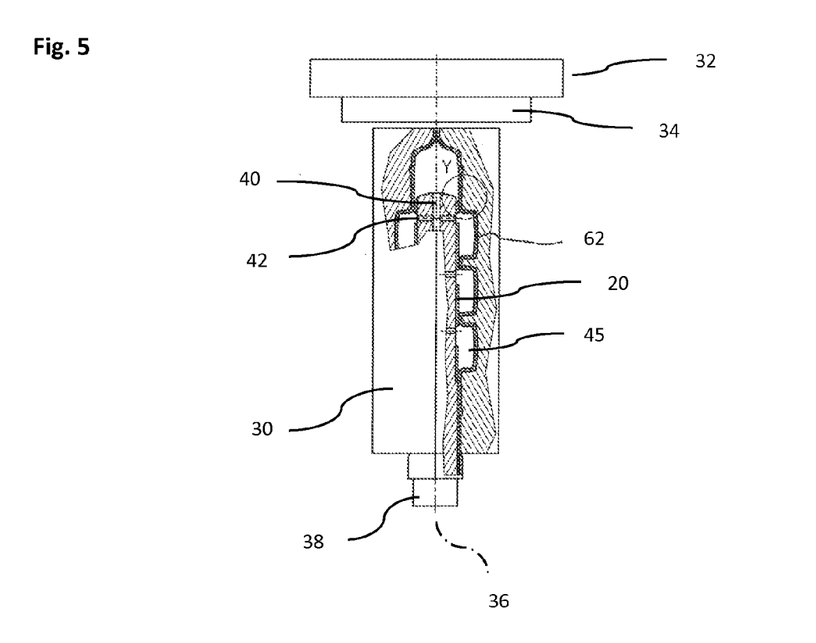
FIG. 5 shows a representation like FIG. 2, but now with the blow mold closed.
Figure 6:
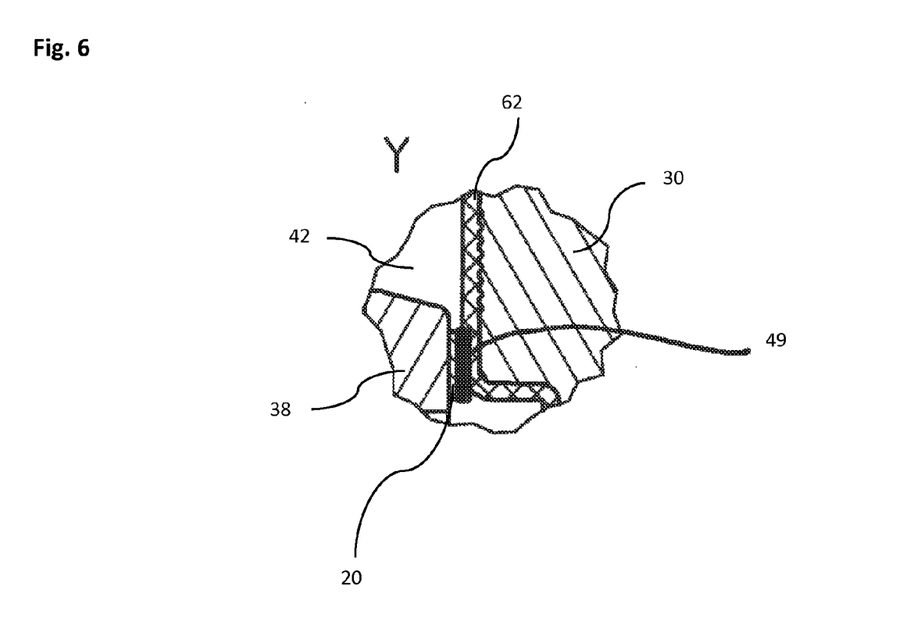
FIG. 6 shows the detail Y from FIG. 5 in an enlarged representation.

FIG. 4 then shows the state in which the blow mold 30 is closed. During the closing of the mold, the preform 22 is pinched at the top, so that no air can escape there from the preform 22. During the closing of the mold, the preform 22 is pressed in the lower region, below the later volume chambers, against the inner part 20, so that a tight connection is achieved there too. As a result, the preform 22 is hermetically sealed. The inflating operation can then be performed. The inflation achieves the result shown in FIG. 5; the preform 22 is pressed against the walls of the mold. At the same time, the preform 22 is pressed in some regions against the inner part 20; this is preferably performed mechanically. Local connections between the inner part 20 and the preform 22 are achieved. These local connections are preferably annular. There are local, annular connections between neighboring volume chambers 45.

Figure 7:
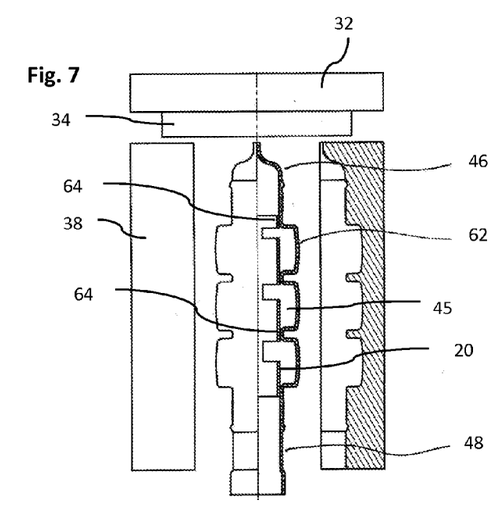
FIG. 7 shows a representation like FIG. 2, but now with the blow mold open.
Figure 8:
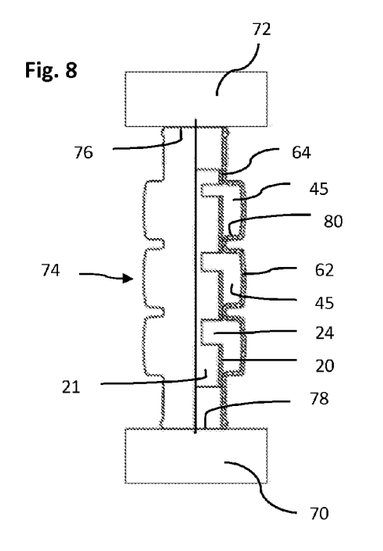
FIG. 8 shows a side view of a finished damper; the side view is in the form of a section to the right of an axial line.

The blow mold 30 can then be opened; FIG. 7 shows the corresponding state. It can be seen that a damper 74 has been produced. However, upper flash 46, also known as pinch-off flash, and lower flash 48, likewise pinch-off flash, must still be removed in order to obtain the finished component of the damper 74, as it is represented in FIG. 8.

Figure 9:
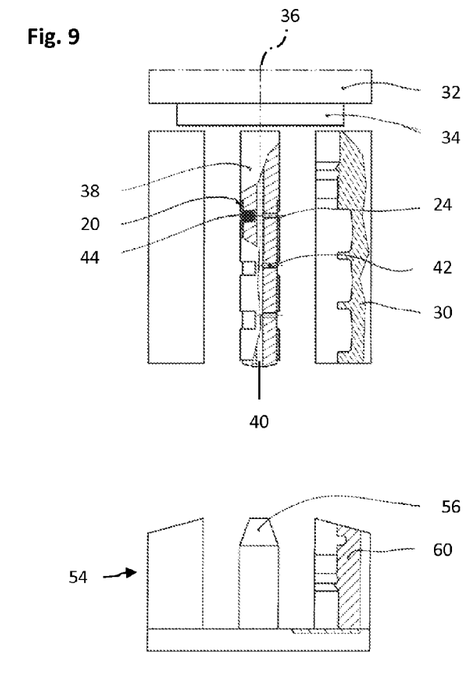
FIG. 9 shows a representation like FIG. 2, but with additional representation of a moving lower mold and intended for producing a damper with a connection tube according to a second exemplary embodiment.

FIGS. 9 to 15 show the second exemplary embodiment. It does not differ from the first exemplary embodiment with regard to the production of the actual damper 74. The difference, however, lies in the fact that now a component that is made up of a damper 74 according to the first exemplary embodiment and a connection tube 50 connected to it in one piece is produced. As a difference from the first exemplary embodiment, not only the tubular preform 22 of the outer jacket 62 is produced in the die 34, but at the same time, and in advance in the exemplary embodiment shown, a preform part 52 for the connection tube 50. The two are joined together in one piece. By contrast with the first exemplary embodiment, the blowing mandrel 38 can now no longer be introduced into the blow mold 30 from below, but only from above. This may be disrupted by a fixed stop 44, as is provided in the first exemplary embodiment. FIG. 9 therefore shows a second possible embodiment for a stop 44. A resilient element, which is elastically biased in the outward direction, is provided in the blowing mandrel 38; it takes the form for example of a ball that is pressed outwardly by a radial spring against a seat and projects in the outward direction. This stop 44 then interacts with the passages 24, as FIG. 9 shows.

FIG. 9 then shows as a difference from the first exemplary embodiment a movable lower mold 54; it is shown in the open state. It comprises two parts; it has a mold cavity for the formation of an end region of a connection tube 50. It also has a receptacle 56 for the preform part 52.

Figure 10:
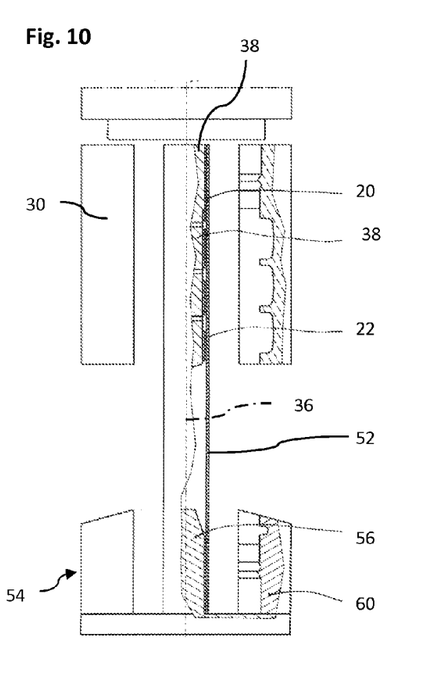
FIG. 10 shows a representation corresponding to FIG. 3 for the second exemplary embodiment with the blow mold according to FIG. 9.

FIG. 10 then shows in a way corresponding to FIG. 3 the state in which the preform part 52 and above it the preform 22 are created, and the preform 22 is located over the inner part 20. The preform part 52 is located under the upper blow mold 30 and has engaged with its lower end over the receptacle 56.

Figure 11:
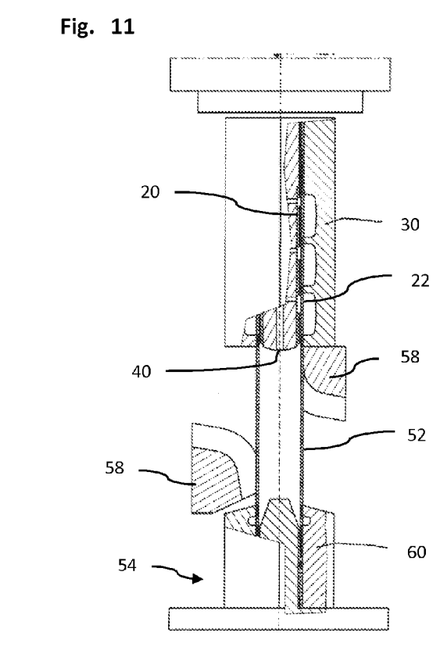
FIG. 11 shows a representation like FIG. 9, now in the closed state of the blow mold.
Figure 12:
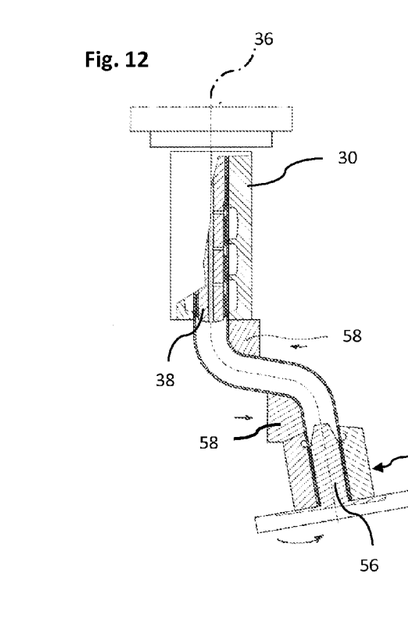
FIG. 12 shows a representation like FIG. 11, but now the preform part has been deformed for the connection tube.

The mold is then closed, as FIG. 11 shows. Before the blowing step, first the molding of the preform part 52 into a form that corresponds largely to the form of the later connection tube 50 is performed. For this purpose, as FIG. 12 shows, first the preform part 52 is bent, so that its axis 36 is no longer straight. The bending shown is substantially S-shaped. It is supported by movable mold parts 58. These are moved in the direction of the depicted arrows 27. The lower mold 54 is substantially laterally displaced, see arrow 27.

Figure 13:
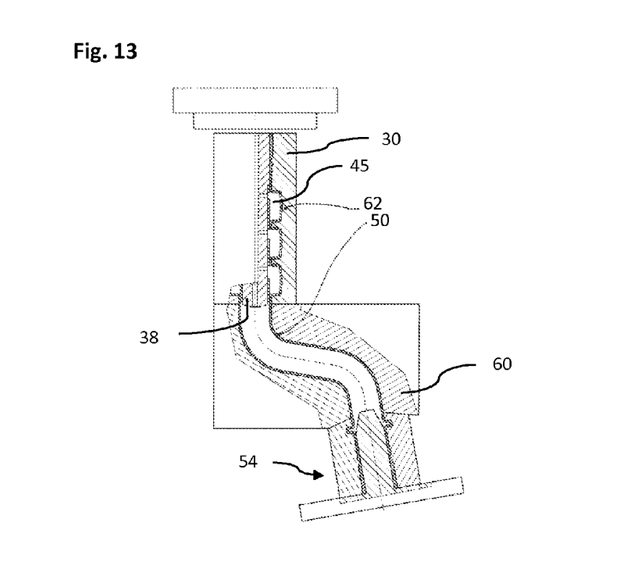
FIG. 13 shows a representation like FIG. 12, but now a lower blow mold has been added; the state during the inflation of the preform and the preform part for the connection tube is shown.

In the representation that is shown in FIG. 13, the movable mold parts 58 have been removed; provided around the preform part 52 instead is a lower blow mold 60, which extends between the upper blow mold 30 and the lower mold 54. In the state as it is now, the step of blow molding can be performed. Not only is the damper 74 thereby created in the blow mold 30, but at the same time the preform part 52 is also pressed against the lower blow mold 60, so that the connection tube 50 is formed there.

Figure 14:
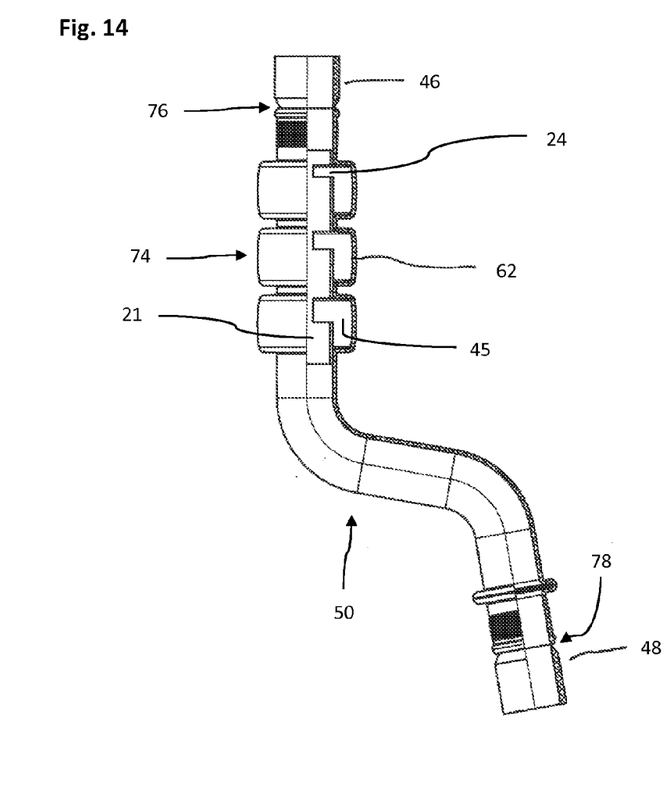
FIG. 14 shows a side view of the finished component comprising the damper and the connection tube, once again represented as a sectional part to the right of an axial line.
Figure 15:
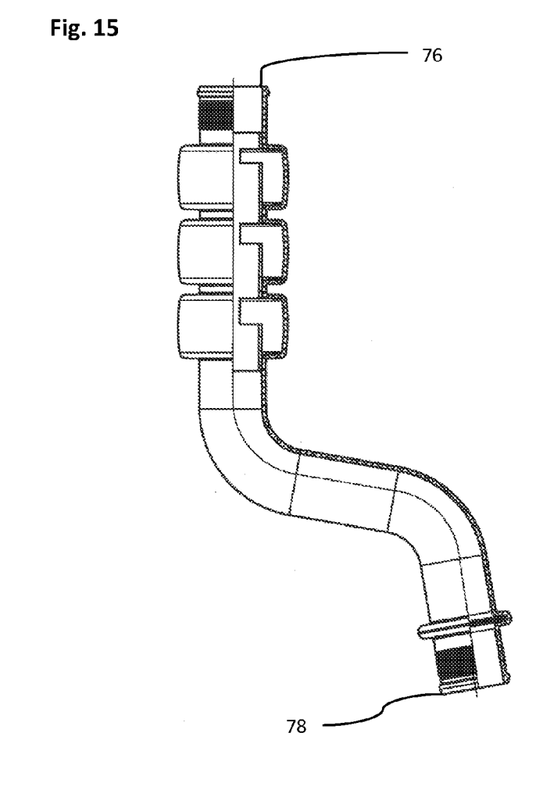
FIG. 15 shows the component according to FIG. 14 after removal of the flash.

FIG. 14 shows the component that is made up of a damper and, connected to it in one piece, a connection tube 50 on the underside of the damper 74. This unfinished part still has flash 46, 48, which is detached in a known way. FIG. 15 shows the finished component.

The invention claimed is:

1. A method for producing a damper for an air line of an internal combustion engine includes the following steps:
   producing, providing an inner part and bringing the inner part to a temperature of at least 100° C., the inner part having a plurality of passages,
   creating a tubular preform of an outer shell from a thermoplastic melt and bringing the tubular preform to a temperature of at least 100° C.,
   fitting the inner part over an outer shell of a blowing mandrel of a blow mold, which is open, the blowing mandrel having a plurality of air channels opening out into a plurality of outlet openings of the blowing mandrel, which outlet openings are arranged on the outer shell, and the passages being positioned over the outlet openings,
   fitting the preform over the inner part,
   closing the blow mold and inflating the preform against the walls of the blow mold, whereby an outer jacket is obtained, and pressing the preform and the inner part at some places against one another along a plurality of connecting regions to obtain local connections between the inner part and the outer jacket, and
   opening the blow mold and removing the damper.

2. The method as claimed in claim 1, wherein the preform and the inner part are brought to a temperature of at least 130° C. before the blowing and pressing are carried out.

3. The method as claimed in claim 1 wherein the step of fitting the preform over the inner part further includes maintaining a distance between the inner part and the preform, at least outside the connecting regions.

4. The method as claimed in claim 1, wherein the connecting regions are located between neighboring volume chambers and run annularly around the axis.

5. The method as claimed in claim 1, wherein during the step of producing the tubular preform for the outer jacket, the method further includes producing a preform part for the production of a connection tube, wherein the preform and the preform part are joined together in one piece.

6. The method as claimed in claim 1, wherein the preform and the inner part are brought to a temperature of at least 130° C. before the blowing and pressing are carried out.

7. A method for producing a damper for an air line of an internal combustion engine, the method includes the following steps:
   producing and providing a temperature-controlled inner part, the inner part having a plurality of passages,
   creating a temperature-controlled tubular preform of an outer shell from a thermoplastic melt,
   fitting the temperature-controlled inner part over an outer shell of a blowing mandrel of a blow mold, which is open, the blowing mandrel having a plurality of air channels opening out into a plurality of outlet openings of the blowing mandrel, the outlet openings are arranged on the outer shell, and the passages being positioned over the outlet openings,
   fitting the temperature-controlled preform over the inner part, closing the blow mold and inflating the preform against the walls of the blow mold, whereby an outer jacket is obtained, and pressing the preform and the inner part at some places against one another along a plurality of connecting regions to obtain local connections between the inner part and the outer jacket, and opening the blow mold and removing the damper.

8. The method as claimed in claim 7, wherein the preform and the inner part are brought to a temperature of at least 100° C. before the blowing and pressing are carried out.

* * * * *